United States Patent [19]
Webster

[11] 4,391,514
[45] Jul. 5, 1983

[54] SIDELOOKING LASER ALTIMETER FOR A FLIGHT SIMULATOR

[75] Inventor: Larry D. Webster, San Jose, Calif.

[73] Assignee: The United States of America as represented by the Administrator of the National Aeronautics and Space Administration, Washington, D.C.

[21] Appl. No.: 234,224

[22] Filed: Feb. 13, 1981

[51] Int. Cl.³ .......................... G01C 3/10; G09B 9/08
[52] U.S. Cl. ......................................... 356/1; 356/4; 358/104; 358/109; 434/4; 434/38
[58] Field of Search .................. 434/4, 38; 356/1, 4; 358/109, 104

[56] References Cited

U.S. PATENT DOCUMENTS

| | | | |
|---|---|---|---|
| 3,183,295 | 5/1965 | Myles | 434/4 |
| 3,194,869 | 7/1965 | Eisenberg | 434/4 |
| 4,068,955 | 1/1978 | Bodlaj | 356/1 |
| 4,097,154 | 6/1978 | Peters et al. | 434/43 |
| 4,183,672 | 1/1980 | Raber et al. | 356/4 |

FOREIGN PATENT DOCUMENTS

WO80/02455 11/1980 PCT Int'l Appl. .................. 356/1

Primary Examiner—S. C. Buczinski
Attorney, Agent, or Firm—Darrell G. Brekke; John R. Manning; Robert D. Marchant

[57] ABSTRACT

The object of the invention is to provide an improved laser altimeter for a flight simulator which will allow measurement of the height of the simulator probe above the terrain directly below the probe tip.

A laser beam 22 is directed from the probe 13 at an angle $\theta$ to the horizontal to produce a beam spot 20 on the terrain. The angle $\theta$ that the laser beam 22 makes with the horizontal is varied so as to bring the beam spot into coincidence with a plumb line 18 coaxial with the longitudinal axis of the probe 13. A television altimeter camera 30 observes the beam spot and has a raster line aligned with the plumb line 18. Spot detector circuit 26 coupled to the output of the TV camera monitors the position of the beam spot relative to the plumb line 18. An error signal is produced by computer 28 driving, via a servo motor 23, the laser beam optics so as to cause the beam spot to come into coincidence with the plumb line 18. At coincidence, computer 28 looks up in a table the altitude of the probe for the given angle $\theta$ and reads out the altitude to an altimeter readout 31.

11 Claims, 9 Drawing Figures

Fig_5

Fig_6

Fig_7

Fig_8

SIDELOOKING LASER ALTIMETER FOR A FLIGHT SIMULATOR

ORIGIN OF THE INVENTION

The invention described herein was made by an employee of the U.S. Government and may be manufactured and used by or for the Government for Governmental purposes without the payment of any royalties thereon or therefor.

TECHNICAL FIELD

The technical field of the present invention relates in general to laser altimeters for flight simulators.

BACKGROUND ART

Heretofore a laser altimeter system has been proposed for determining the altitude of a flight simulation probe over a model board. Such a prior art system is disclosed in an article entitled, "Probe Protection In Camera/Model Visual Systems" appearing in the Proceedings of the 1980 Summer Computer Simulation Conference, Olympic Hotel, Seattle, Wash., Aug. 25-27, 1980.

In this system, a laser beam is directed vertically from the flight simulator TV camera probe along a side of the probe to strike a point on the model board radially displaced from a point directly below the center line of the probe, hereafter referred to as a plumb line. The incident beam produces a beam spot on the terrain of the model which is thence imaged onto a linear array sensor. As the height of the probe is varied, while holding the probe otherwise stationary, from a point of minimum altitude to a point of maximum altitude the beam spot traverses a vertical imaginary line focused onto the linear array sensor. The position of the imaged beam spot along the linear array sensor is representative of altitude. A major problem with this system is that the altitude being measured is not the altitude of the probe (altitude measured along the plumb line) but rather the altitude of the laser beam source which is displaced horizontally from the probe. The actual distance between the plumb line and the laser beam must be multiplied by the scale of the model. Error will be produced whenever the terrain elevation at the plumb line differs from the terrain elevation at the laser beam. For example, an appreciable error would exist if the plumb line was over a depression and the laser beam impinged on a hill, mountain or tall building.

Thus, it is desirable to obtain a probe height sensor which more accurately measures the height of the probe above the terrain directly below the probe.

[STATEMENT OF INVENTION]
DISCLOSURE OF INVENTION

In the present invention, pilot altitude as represented by the distance h is measured by a technique that locates the point of intersection of the plumb line and the terrain (hereinafter known as the convergence point). A laser beam is directed from the probe at an angle to the plumb line and coaxial with the longitudinal axis of the probe. The point where the beam strikes the terrain is varied by changing the angle of the laser beam relative to the longitudinal axis of the probe so that the beam spot is brought to a point on the longitudinal axis of the probe where it intersects the terrain. A TV camera, carried from the probe views the region below the probe and has a predetermined linear detection region, such as a raster line, coaxially aligned with the image of the plumb line. A detection circuit receives the output of the TV camera and determines the position of the laser dot in the raster. Using this information, a computer determines the position of the beam spot relative to the plumb line. A resolver coupled to the laser beam angle control reads out the angular position $\theta$ of the laser beam to a computer. The computer looks up the height of the probe in a look up table for the angle $\theta$ of the laser beam. The measured height is then read out to an altimeter and to a flight simulation monitor station. If the laser dot does not reside on the plumb line, a computer directs a stepper motor to relocate the beam such that the dot will reside on the plumb line. If the operative laser beam is unable to be relocated at the convergence point because it is blocked by a terrain obstruction, an alternative laser beam at a different angle around the probe is selected. Also, if the TV camera's view is blocked the computer selects an alternative TV camera.

DETAILED DESCRIPTION OF THE INVENTION

Figure 1:
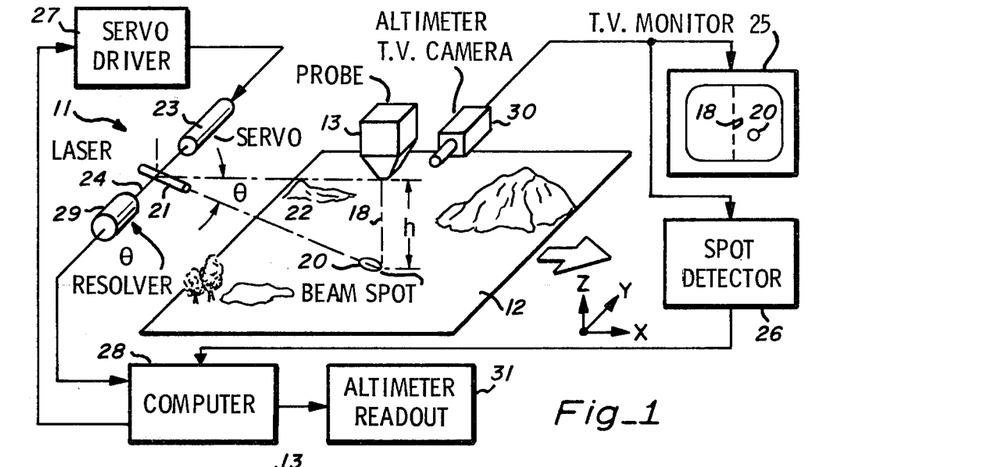
FIG. 1 is a schematic perspective view, partly in block diagram form, of an altimeter system for a flight simulator incorporating features of the present invention.

Referring now to FIG. 1 there is shown a laser altimeter system 11 for a flight simulator and incorporating features of the present invention. The flight simulator system includes a model board 12 comprising a scale model of terrain over which simulated flights are to be conducted. The pilot sits in a cockpit, not shown, and views a television screen displaying a view seen through a probe 13 movable with respect to the terrain of the model board 12 in accordance with flight control commands given by the pilot over the aircraft controls. The probe 13 is carried from a gantry, not shown, disposed over the terrain of the model board 12. Relative movement in three orthogonal directions, X, Y, and Z is obtained between the probe and the model board. In some embodiments, the gantry moves relative to a stationary model board to provide movement in all three orthogonal directions, whereas, in other embodiments the model board is moved relative to the probe to simulate flight.

Figure 2:
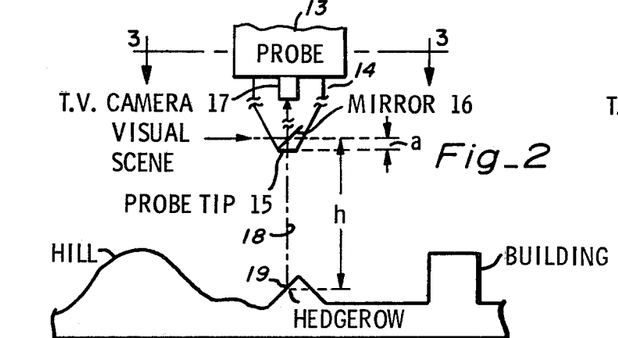
FIG. 2 is a longitudinal sectional view of the flight simulator probe and model board.

Referring now to FIG. 2, the optical system for the probe 13 is shown in greater detail. More particularly, the probe 13 includes an elongated barrel portion 14 projecting in the Z direction toward the model board. At the end or tip of the probe 15 there is a mirror 16 which projects a visual scene corresponding to that which would be seen by the pilot, up along the longitudinal axis of the probe barrel 14 to a TV camera 17. The scene picked up by the TV camera is then transmitted to and displayed on a cathode ray tube outside the windshield of the simulated aircraft. The altitude h of the simulated aircraft is that scale distance from the mirror 16 is taken along a plumb line 18 for the modeled terrain to a point of intersection of the plumb line with the terrain at 19.

Referring again to FIG. 1, a laser 21 is carried from a frame coupled to and movable with the probe 13. The laser directs a pencil-like beam 22 of monochromatic nondivergent radiation of visible wavelength onto the terrain below the probe 13 having been deflected by pitchable mirror 35 to produce a beam spot 20 on the terrain. A servo motor 23 is coupled to the mirror 35 in such a way as to vary the angle $\theta$ that the laser beam 20 makes to the horizontal or XY plane of the model board 12. The laser beam is rotatable about an axis of revolution parallel to the horizontal XY plane and such beam being rotatable in a plane normal to said axis of revolution, such plane also containing the plumb line 18.

An altimeter TV camera optical system 30 is also carried from the probe frame. The altimeter TV camera system 30 includes some optics, not shown, and views the region of the model board directly below the probe 13. The TV camera optics are such that the point of intersection of plumb line 18 with the model board surface is within the view of the TV camera system 30 for all values of altitude h from minimum to maximum above the surface of the model board 12.

A single raster line is made coincident with the plumb line 18 through appropriate mechanical alignment. An output from the altimeter TV camera 30 goes to a spot detector circuit 26 of the type similar to that disclosed in U.S. Pat. No. 3,320,360 issued May 16, 1967 entitled, "Television Tracking Error Detector", for determination of the location of the beam spot 20 relative to the plumb line 18.

The output of spot detector 26 is fed to a computer 28. This output consists of the raster line number and displacement along the raster line of all of the detected elements of the laser spot 20. The computer determines the location of the center of the laser spot 20 in the raster of the altimeter TV camera system 30. To be coincident with the end of the plumb line 18, the laser spot 20 must lie somewhere along the altimeter TV camera system raster line which was made coincident with the plumb line 18. The computer 28 compares the raster line number of the center of the laser spot 20 with the raster line number of the raster line which is coincident with the plumb line 18. If the two are equal then the laser spot 20 must be located on the terrain at the end of plumb line 18 where it intersects the terrain. The exact length of plumb line 18 may then be determined. If the two are not equal, the laser spot 20 is not located at the end of plumb line 18 where it intersects the terrain. An error signal is generated which causes servo driver 27 to reposition laser spot 20 until the two raster line numbers are equal. The computer 28 also receives the angle $\theta$ input from a resolver 29 mechanically coupled to the laser beam deflection system so that at the point of convergence of the beam spot 20 with the point of entry of the plumb line 18 into the terrain, the computer reads the $\theta$ angle and looks up, in its look up table, the value of altitude corresponding to the given values of altitude for various values of $\theta$ as the probe is moved from a position of minimum altitude to maximum altitude over the model board.

Figure 3:
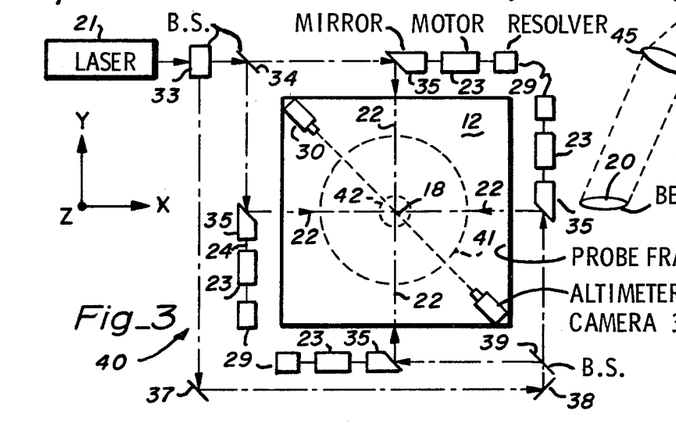
FIG. 3 is a schematic transverse sectional view, partly in block diagram form, of a portion of the structure of FIG. 2 taken along line 3—3 in the direction of the arrows.

Referring now to FIG. 3 there is shown the optical distribution system for deriving the various laser beams and for televising the beam spot 20 on the model board. The laser 21 is affixed to a probe frame member 32, and directs its output beam through first and second beam splitters 33 and 34. Beam splitter 33 is arranged to direct the reflected portion of the beam downward along the Z axis whereas the other half of the beam passes through the first beam splitter 33, to the second beam splitter 34 which serves to further divide the beam into a first beam directed parallel to the X axis and a second beam of equal amplitude directed along the Y axis. Each of the beams outputted from the second beam splitter 34 is directed onto a 45° angle mirror 35 for bending the respective beam by 90° toward the plumb line 18. Each of the mirrors is driven from a stepping servo motor 23 about respective axes of revolution. In one instance the axis of revolution is parallel to the X axis and in the other to the Y axis and both are in the XY plane so as to cause the beams to be rotated within respective planes which are perpendicular to the XY plane and each of which includes the plumb line 18. A $\theta$ angle resolver 29 is coupled to each of the motor-mirror drive trains for giving an output determinative of the angle $\theta$.

The other half of the output of the first beam splitting mirror 33 is directed downward along the Z axis to a 45° mirror, not shown, which thence directs the beam parallel to the Y axis to a second 45° mirror 37 and thence parallel to the X axis to another 45° mirror 38 which thence directs the beam through a second beam splitting mirror 39 for splitting the beam into two equal components, one parallel to the Y axis and the other parallel to the X axis. The beams are then reflected off of respective 45° mirrors 35 driven from the stepping motors 23 which include resolvers 29. Thus, the second beam produces a pair of beams directed onto the model board 12 which are orthogonal to each other and which are 180° displaced from the first pair of beams. The beams are rotatable in the XZ and YZ planes, such planes each including the plumb line 18. The respective mirrors 35 are positioned such that their output beams will intersect the plumb line 18 at the point that the plumb line 18 intersects the surface of the model 12.

The orthogonality between each of the laser beams is not a requirement. For example, it could be three beams at 120° angular spacing from each other with the camera optics similarly angularly separated from each other by 120° and being spaced at 60° angles from each of the respective beams.

A pair of altimeter TV camera optics are carried from the probe frame structure 32 and are positioned at 180° intervals about an axis of revolution coaxial with the plumb line 18 and preferably at 45° angular spacing from the ZX or ZY planes but on the XY plane containing the respective laser beams. This positioning of the altimeter TV camera optics 30 permits viewing of the respective beam spot 20 at the plumb line 18, regardless of various buildings, hills, or trees or other obstructions in the terrain of the model board 12. In other words there is some combination of laser beam 22 and altimeter TV camera optics 30 which will permit viewing of the beam spot 20 at the plumb line 18 regardless of the obstructions represented by the terrain of the model 12, with the exception of a well or deep ravine. The laser beams 22 which are not in use, i.e., three of the four are "parked" by rotating their respective mirrors 35 so as to project the beam spot 20 onto the probe body 41 or 42.

Figure 4:
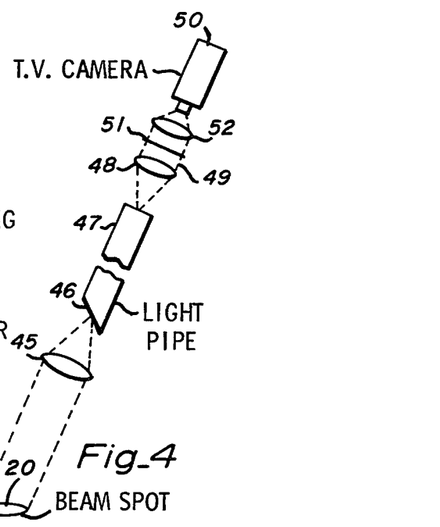
FIG. 4 is a schematic side elevational view of the TV camera optics for beam spot detection.

Referring now to FIG. 4 there is shown one of the optical systems 30 for each of the TV altimeter cameras. More particularly, a condensing lens 45 receives the light emanating from the beam spot 20 and focuses the image of the beam spot onto the entrance plane 46 of a light pipe 47 such as a fiber optics bundle. The bundle 47 may have a suitable length as of 3-5 feet to bring the image of the beam spot 20 to a convenient location of the TV camera 50, typically somewhere on the gantry. Another lens 48 receives the beam spot image at the output face of the light pipe 47 and converts the image into a beam of parallel light 49 which is thence directed through a narrow pass filter 51 having a pass band at the wavelength of the laser beam 22 so as to filter out undesired background illumination. The filtered beam is thence fed to a condensing lens 52 which focuses the beam spot image onto the receiving face of the TV camera 50. The input face of the light pipe 46 is cut at the Scheimpflug angle, as described in U.S. Pat. No. 751,347 issued Feb. 2, 1904, so that the plumb line 18 of the probe is maintained in focus on the input face of the TV camera 50.

Figure 5:
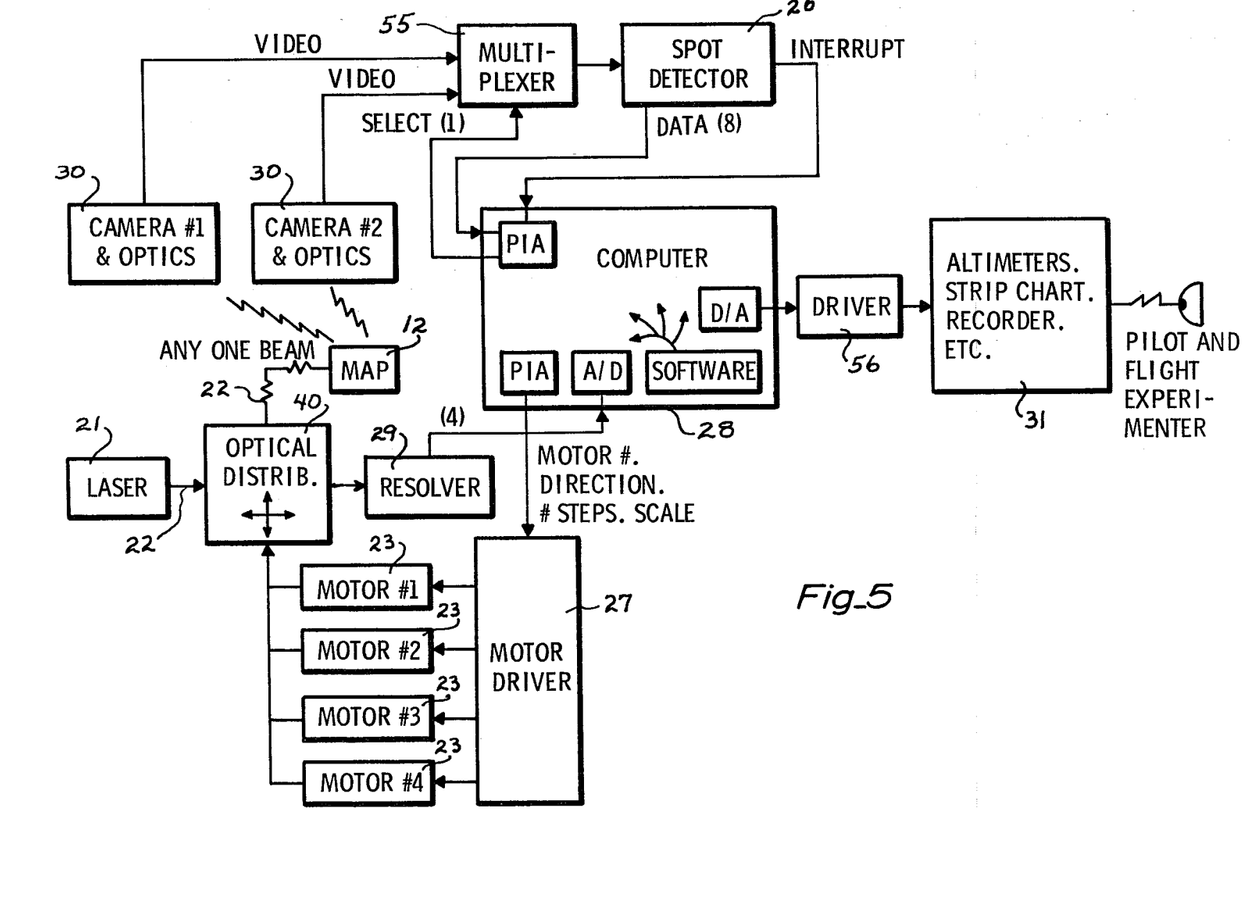
FIG. 5 is a schematic block diagram of a laser altimeter system incorporating features of the present invention.

Referring now to FIG. 5 there is shown, in block diagram form, the laser altimeter system 11 of the present invention. The output beam 22 of the laser 21 is fed through an optical distribution system 40 as shown in FIG. 3. One of the output beams 22 is selected and directed onto the terrain of the model 12 under the probe 14. The beam spot image 20 is picked up by both of the camera optical systems 30. Their output video signals are fed to a multiplexer 55. The computer 28 selects one or the other of the camera optic systems 30 and feeds a control signal to the multiplexer 55 for controlling which one of the camera optic systems 30 is utilized. The output of the multiplexer 55 is fed to the spot detector 26 which tracks the image of the beam spot 20 relative to the plumb line 18 which is inputted to the computer 28 and thence outputted to the motor driver 27 and respective motor 23. In a typical example, the computer 28 comprises a Motorola 6800 Exorcisor. The resolver 29 outputs the angle θ for the selected beam 22 to an analog-to-digital converter in the computer 28. When the computer 28 detects zero error, i.e., the beam spot is at the plumb line 18, the computer 28 by its software looks up in a table the altitude corresponding to the respective angle θ and outputs that data via a digital-to-analog converter to a driver 56 which thence inputs it to the altimeters or other read out devices 31.

Figure 6:
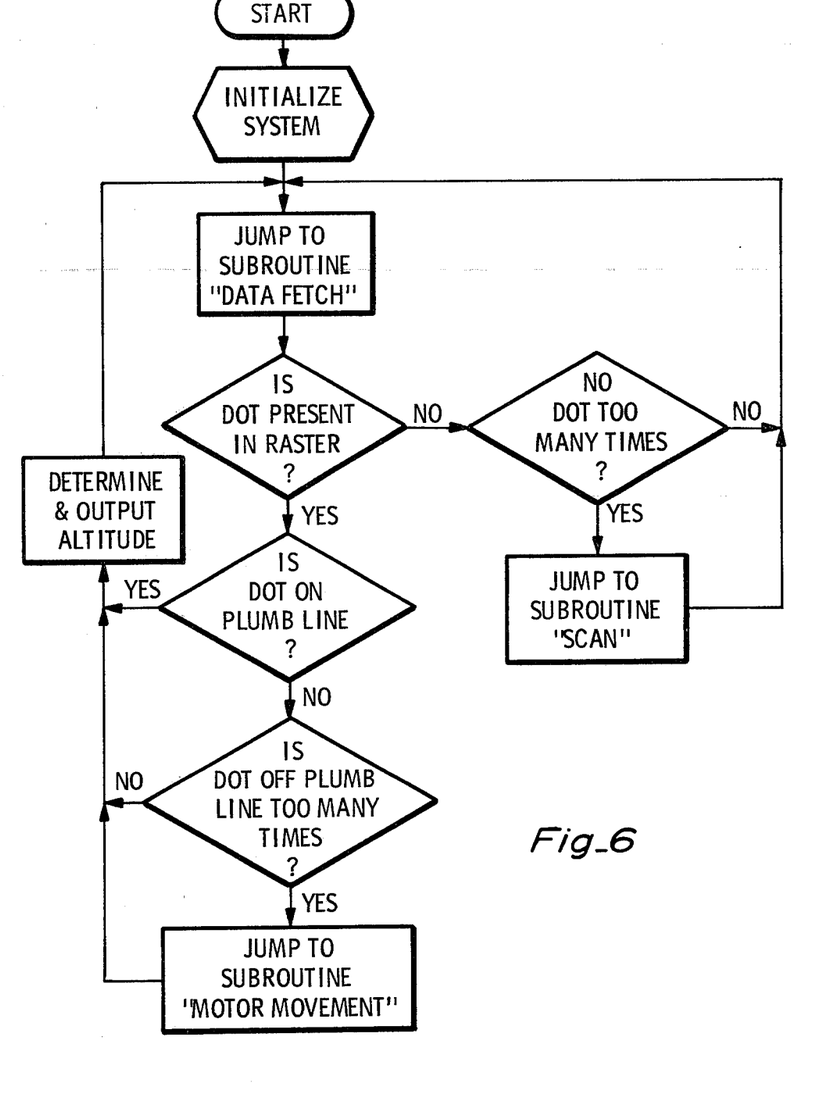
FIG. 6 is a logic flow diagram for the computer program for the system of the present invention.
Figure 7:
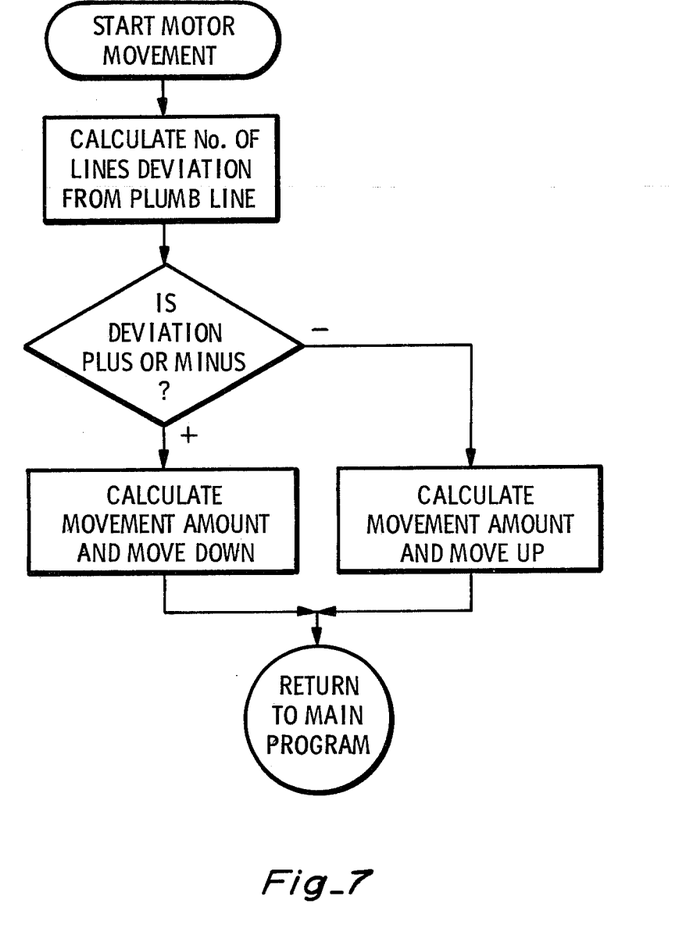
FIGS. 7, 8, and 9 are logic flow diagrams for subroutines of the computer program flow diagram depicted in FIG. 6.
Figure 8:
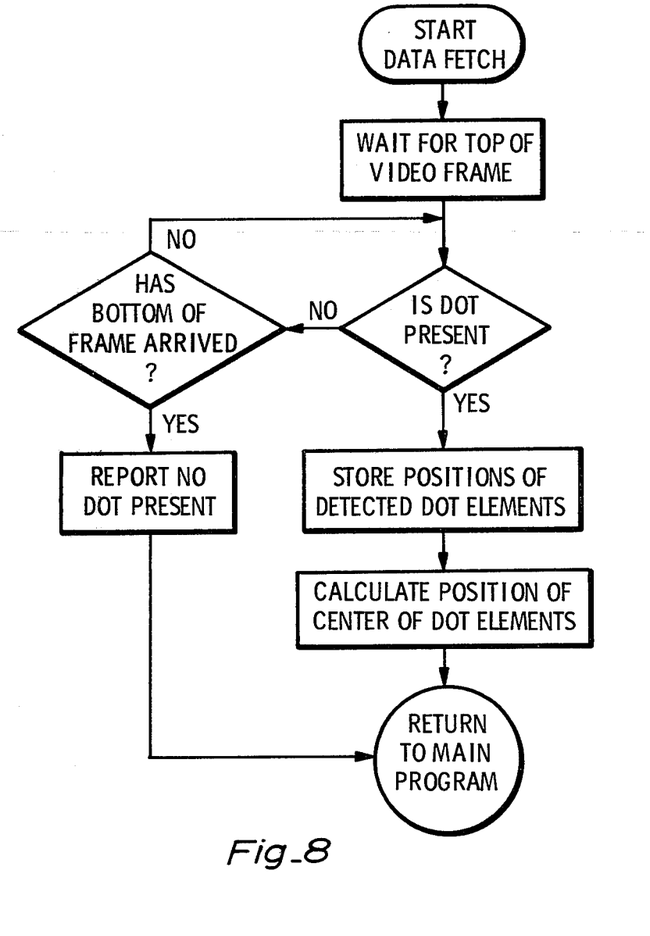
Figure 9:
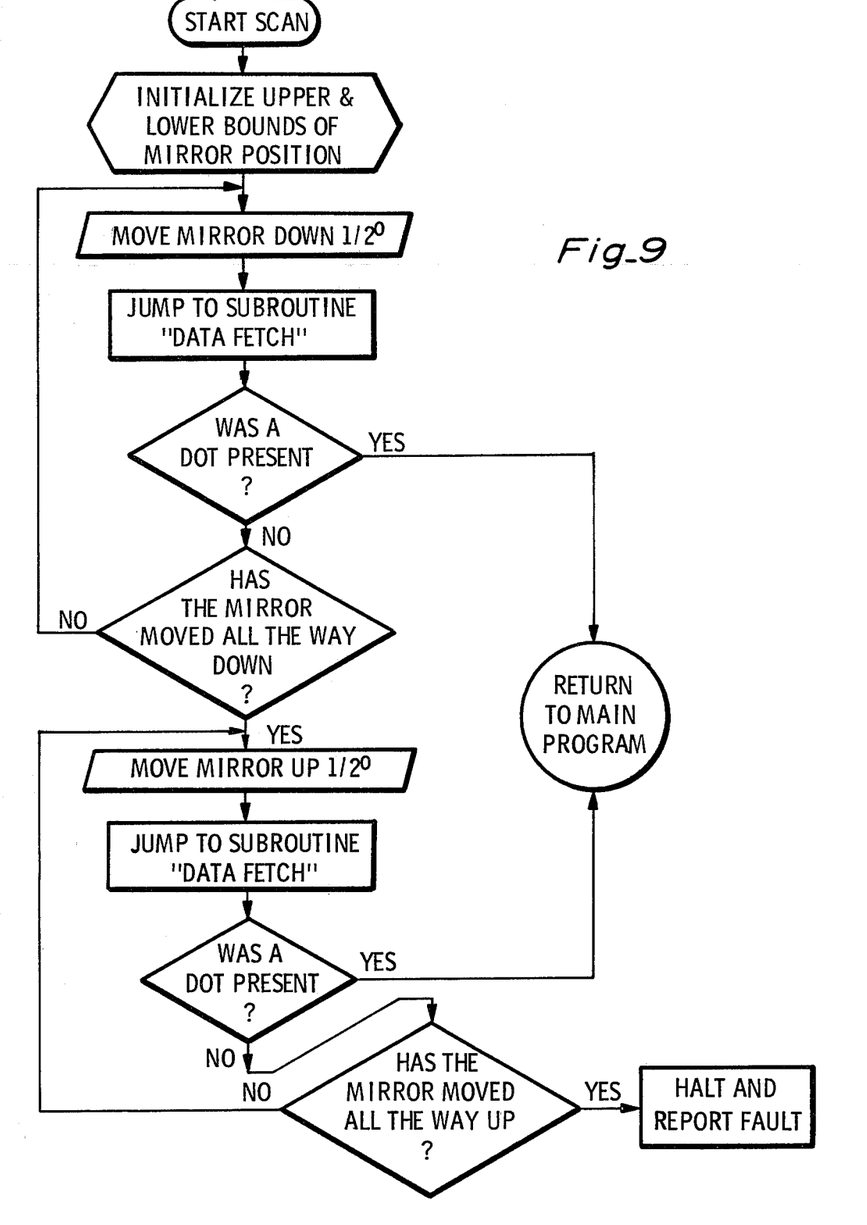

Referring now to FIG. 6, there is shown the logic flow chart for the software program for the computer 28. FIGS. 7-9 depict the logic flow charts for program subroutines, namely, MOTOR MOVEMENT, DATA FETCH, and SCAN, respectively. The program listing is shown in Appendix I, below.

One of the advantages of the laser altimeter system of the present invention for a flight simulator includes detecting the altitude of the probe above a position directly below the probe as opposed to a position displaced in the horizontal plane from the probe. This makes the concept inherently accurate. Secondly, the provision of angularly displaced laser beams 22 and camera optics 30 allows reading of the altitude regardless of the obstructions represented by features in the terrain which might otherwise obstruct viewing of the beam spot.

APPENDIX I

```
00010  00001                         ************************************
00020  00002                         *              LASER               *
00030  00003                         *           OPERATING              *
00040  00004                         *             SYSTEM               *
00050  00005                         ************************************
00060  00006                         NAM     LASOP
00070  00007A 5000                   ORG     $5000
00080  00008                         OPT     CRE, L, P=43, U, LLE=90
00090  00009A 5000   019F   A CONV   FDB     $019F       CONVERGENT RASTER LINE
00100  0001OA 5002   04     A SMMV   FCB     $4          SMALL MVT THRESHOLD
00110  00011A 5003   08     A MDMV   FCB     $8          MEDIUM MVT THRESHOLD
00120  00012A 5004   10     A LGMV   FCB     $10         LARGE MVT THRESHOLD
00130  00013A 5005   03CF   A BIAS   FDB     $03CF       BIAS FOR ALTIM. ZERO
00140  00014A 5007   7F EF41  A      CLR     $EF41       SET UP COLECT PIA'S
00150  00015A 500A   7F EF43  A      CLR     $EF43
00160  00016A 500D   7F EF51  A      CLR     $EF51
00170  00017A 5010   7F EF53  A      CLR     $EF53
00180  00018A 5013   7F EF40  A      CLR     $EF40
00190  00019A 5016   7F EF42  A      CLR     $EF42
00200  00020A 5019   7F EF50  A      CLR     $EF50
00210  00021A 501C   86 9C   A       LDAA    #$9C
00220  00022A 501E   B7 EF52 A       STAA    $EF52
00230  00023A 5021   86 04   A       LDAA    #4
00240  00024A 5023   B7 EF53 A       STAA    $EF53
00250  00025A 5026   B7 EF43 A       STAA    $EF43
00260  00026A 5029   7F EF52 A       CLR     $EF52       STOP HARDWARE SYSTEM
00270  00027A 502C   86 04   A       LDAA    #4
00280  00028A 502E   B7 EF41 A       STAA    $EF41
00290  00029A 5031   B7 EF51 A       STAA    $EF51
00300  00030A 5034   B6 EF50 A       LDAA    $EF50       CLR INTERRUPT
00310  00031A 5037   B6 EF52 A FLAG  LDAA    $EF52       INITIALIZE EVENT COUNTER
00320  00032A 503A   84 20   A       ANDA    #$20
00330  00033A 503C   27 0A 5048      BEQ     OUTLOP      BUFFER EMPTY?
00340  00034A 503E   86 10   A       LDAA    #$10        RAISE READ ENABLE
00350  00035A 5040   B7 EF52 A       STAA    $EF52
```

```
00360 00036A 5043 7F EF52  A          CLR     $EF52
00370 00037A 5046 20 EF 5037          BRA     FLAG        RETURN, INITIAL. DONE?
00380 00038A 5048 7F 533A  A OUTLOP   CLR     STABLE      LINE STABILITY CHECK
00390 00039A 504B 7F 5339  A          CLR     STB1        # OF NO DOT PASSES
00400 00040A 504E 7F EF71  A          CLR     $EF71       INITIALIZE MOTOR PIA
00410 00041A 5051 86 FF               LDAA    #$FF
00420 00042A 5053 B7 EF70  A          STAA    $EF70
00430 00043A 5056 86 06               LDAA    #6
00440 00044A 5058 B7 EF71  A          STAA    $EF71
00450 00045A 505B BD 50A2  A GO       JSR     COLECT      GO GET DATA FROM VIDEO
00460 00046A 505E BD 525A  A          JSR     DIST        GO CALC ALTITUDE
00470 00047A 5061 FE 53D6  A          LDX     DOT
00480 00048A 5064 27 0A 5070          BEQ     STA1        IS DOT (NOT) THERE?
00490 00049A 5066 7F 5339  A          CLR     STB1        IF DOT, CLR # NO DOTS
00500 00050A 5069 8C 0001  A FILTER   CPX     #1
00510 00051A 506C 27 ED 505B          BEQ     GO          SYSTEM ERROR, TRY AGAIN
00520 00052A 506E 20 14 5084          BRA     RUN         RUN SYSTEM WITH GOOD DOT
00530 00053A 5070 86 01    A STA1     LDAA    #1          # OF CONSEQ. NO DOT PASS
00540 00054A 5072 B0 5339  A          SUBA    STB1
00550 00055A 5075 27 05 507C          BEQ     SEND        NO DOT TWICE?
00560 00056A 5077 7C 5339  A          INC     STB1        ACK ONE NO DOT PASS
00570 00057A 507A 20 DF 505B          BRA     GO
00580 00058A 507C 7F 5339  A SEND     CLR     STB1        CLR # OF NO DOT PASSES
00590 00059A 507F BD 5179  A          JSR     HUNT        GO HUNT FOR MISSING DOT
00600 00060A 5082 20 D7 505B          BRA     GO          RETURN AND TRY AGAIN
00610 00061A 5084 BC 5000  A RUN      CPX     CONV        RASTER LINE STAB. TEST
00620 00062A 5087 27 0C 5095          BEQ     SET1        CONVERGENT?
00630 00063A 5089 86 01    A          LDAA    #1          PUT STABLE BIT HERE
00640 00064A 508B B0 533A  A          SUBA    STABLE
00650 00065A 508E 27 0D 509D          BEQ     DRIVE       IS DOT NOT CONV?
00660 00066A 5090 7C 533A  A          INC     STABLE      ACK NOT CONV PASS
00670 00067A 5093 20 C6 505B          BRA     GO          RETURN AND TRY AGAIN
00680 00068A 5095 7F 533A  A SET1     CLR     STABLE
00690 00069A 5098 BD 525A  A          JSR     DIST        CALC DIST FOR ALTIM
00700 00070A 509B 20 BE 505B          BRA     GO          RETURN AND PROCESS AGAIN
00710 00071A 509D BD 5200  A DRIVE    JSR     MOVE        GO TO MIRROR ADJUST SR.
00720 00072A 50A0 20 B9 505B          BRA     GO          RETURN AND REPROCESS
00730 00073A 50A2 7F 5359  A COLECT   CLR     LDATA       INITIALIZE DATA REG'S
00740 00074A 50A5 7F 535A  A          CLR     LDATA+1
00750 00075A 50A8 7F 5395  A          CLR     DDATA
00760 00076A 50AB 7F 5396  A          CLR     DDATA+1
00770 00077A 50AE 7F 53D1  A          CLR     COUNT1
00780 00078A 50B1 7F 53D2  A          CLR     NUMB1
00790 00079A 50B4 7F 53D5  A          CLR     COUNT2
00800 00080A 50B7 B6 EF50  A          LDAA    $EF50       CLR H-WARE INTERRUPT
00810 00081A 50BA 86 80               LDAA    #$80
00820 00082A 50BC B7 EF52  A          STAA    $EF52       START HARDWARE RUNNING
00830 00083A 50BF 86 FF               LDAA    #$FF        LOOP TIMER
00840 00084A 50C1 F6 EF51  A JMP2     LDAB    $EF51       CHECK FOR DOT INTERRUPT
00850 00085A 50C4 2B 39 50FF          BMI     READ        IF SEE DOT, READ DATA
00860 00086A 50C6 FF 53D3  A          STX     DUMMY       PAD LOOP TIME
00870 00087A 50C9 FF 53D3  A          STX     DUMMY
00880 00088A 50CC FF 53D3  A          STX     DUMMY
00890 00089A 50CF FF 53D3  A          STX     DUMMY
00900 00090A 50D2 FF 53D3  A          STX     DUMMY
00910 00091A 50D5 FF 53D3  A          STX     DUMMY
00920 00092A 50D8 FF 53D3  A          STX     DUMMY
00930 00093A 50DB FF 53D3  A          STX     DUMMY
00940 00094A 50DE FF 53D3  A          STX     DUMMY
00950 00095A 50E1 FF 53D3  A          STX     DUMMY
00960 00096A 50E4 FF 53D3  A          STX     DUMMY
00970 00097A 50E7 FF 53D3  A          STX     DUMMY
00980 00098A 50EA FF 53D3  A          STX     DUMMY
00990 00099A 50ED FF 53D3  A          STX     DUMMY
01000 00100A 50F0 7C 53D1  A          INC     COUNT1      # OF NO DOT LOOPS
01010 00101A 50F3 B1 53D1  A          CMPA    COUNT1      $FF LOOPS?
01020 00102A 50F6 26 C9 50C1         BNE     JMP2        RETURN AND TRY AGAIN
01030 00103A 50F8 CE 0000  A          LDX     #0
01040 00104A 50FB FF 53D6  A          STX     DOT         NO DOT FOUND
01050 00105A 50FE 39                  RTS                 RETURN TO MAIN PROG
01060 00106A 50FF 7F EF52  A READ     CLR     $EF52       STOP HARDWARE SYSTEM
01070 00107A 5102 B6 EF52  A CHECK    LDAA    $EF52
01080 00108A 5105 84 20    A          ANDA    #$20        CHECK BUFFER NOT EMPTY
01090 00109A 5107 27 3A 5143          BEQ     DCENTR      ALL DATA IN, GET CNTR
01100 00110A 5109 86 10    A          LDAA    #$10        ENABLE READ ENABLE
01110 00111A 510B B7 EF52  A          STAA    $EF52
01120 00112A 510E B6 EF40  A          LDAA    $EF40       GET WIDTH AND UNPACK
01130 00113A 5111 16                  TAB                 SAVE FOR FUTURE UNPACKING
01140 00114A 5112 84 F0    A          ANDA    #$F0        MASK OTHER INFO
01150 00115A 5114 44                  LSRA
```

```
01160  00116A 5115 44              LSRA
01170  00117A 5116 44              LSRA
01180  00118A 5117 81 03       A   CMPA  #3          MINIMUM WIDTH
01190  00119A 5119 2F 23 513E      BLE   DISAB       IF TOO SMALL, SKIP
01200  00120A 511B 7D 53D5     A   TST   COUNT2      FIRSTOGOODTWIDTH?
01210  00121A 511E 26 1B 513B      BNE   JMP4        IF NOT, GO
01220  00122A 5120 B6 EF42     A   LDAA  $EF42       FIRST GOOD LINE
01230  00123A 5123 43              COMA
01240  00124A 5124 B7 535A   A MARK2 STAA LDATA+1    STORE LSB OF RASTER LINE
01250  00125A 5127 17              TBA
01260  00126A 5128 43              COMA
01270  00127A 5129 84 01       A   ANDA  #1
01280  00128A 512B B7 5359     A   STAA  LDATA       STORE MSB OF RASTER LINE
01290  00129A 512E B6 EF50     A   LDAA  $EF50       GET DISPLACEMENT DATA
01300  00130A 5131 B7 5396   A MARK3 STAA DDATA+1    STORE LSB OF DISPLACEMENT
01310  00131A 5134 17              TBA
01320  00132A 5135 84 0E       A   ANDA  #$0E
01330  00133A 5137 44              LSRA
01340  00134A 5138 B7 5395     A   STAA  DDATA
01350  00135A 513B 7C 53D5   A JMP4 INC  COUNT2      COUNT # OF GOOD DOTS
01360  00136A 513E 7F EF52   A DISAB CLR $EF52       DISABLE READ ENABLE
01370  00137A 5141 20 BF 5102      BRA   CHECK
01380  00138A 5143 B6 53D5   A DCENTR LDAA COUNT2    # OF LINES WITH A DOT
01390  00139A 5146 B7 53DC     A   STAA  WDCNT
01400  00140A 5149 FE 5359     A   LDX   LDATA       GET FIRST LINE #
01410  00141A 514C FF 53D8     A   STX   LINE
01420  00142A 514F FE 5395     A   LDX   DDATA       GET FIRST DISPLACEMENT
01430  00143A 5152 FF 53DA     A   STX   MAX
01440  00144A 5155 74 53DC     A   LSR   WDCNT       DIV BY TWO (FOR CENTER)
01450  00145A 5158 B6 53D9     A   LDAA  LINE+1      D. P. ADD FOR DOT CENTER
01460  00146A 515B BB 53DC     A   ADDA  WDCNT       LSB ADD
01470  00147A 515E B7 53D7     A   STAA  DOT+1       STORE LSB
01480  00148A 5161 B6 53D8     A   LDAA  LINE
01490  00149A 5164 89 00       A   ADCA  #0          MSB ADD
01500  00150A 5166 B7 53D6     A   STAA  DOT         MSB STORE
01510  00151A 5169 B6 53D7     A   LDAA  DOT+1
01520  00152A 516C 84 01       A   ANDA  #1          TEST FOR ODD(NESS)
01530  00153A 516E 27 01 5171      BEQ   ADD1        ADD ONE IF EVEN
01540  00154A 5170 39              RTS               RETURN TO MAIN PROGRAM
01550  00155A 5171 FE 53D6   A ADD1 LDX  DOT         ADD ONE TO MAKE ODD
01560  00156A 5174 08              INX
01570  00157A 5175 FF 53D6     A   STX   DOT
01580  00158A 5178 39              RTS               RETURN TO MAIN PROGRAM
01590  00159A 5179 CE 00FF   A HUNT LDX  #$FF
01600  00160A 517C FF 53DF     A   STX   INFIN       MIRROR AT INFINITE DIST
01610  00161A 517F CE FD54     A   LDX   #$FD54
01620  00162A 5182 FF 53DD     A   STX   ZERO        MIRROR AT ZERO DISTANCE
01630  00163A 5185 BD 50A2   A MZERO JSR COLECT      MOVE MIRROR TO ZERO
01640  00164A 5188 FE 53D6     A   LDX   DOT         CHECK IF A DOT WAS SEEN
01650  00165A 518B 26 72 51FF      BNE   JUMP        RETURN TO MAIN
01660  00166A 518D B6 EF08     A   LDAA  $EF08
01670  00167A 5190 01              NOP
01680  00168A 5191 FE EF08     A   LDX   $EF08       CHECK MIRROR POSITION
01690  00169A 5194 FF 53E1     A   STX   LOCA        STORE MIRROR LOCATION
01700  00170A 5197 B6 53E2     A   LDAA  LOCA+1      D P. SUBTR-DIFF TO ZERO
01710  00171A 519A B0 53DE     A   SUBA  ZERO+1      LSB SUBTRACT
01720  00172A 519D B7 53E4     A   STAA  DIFF+1      LSB RESULT STORE
01730  00173A 51A0 B6 53E1     A   LDAA  LOCA
01740  00174A 51A3 B2 53DD     A   SBCA  ZERO        MSB SUBTRACT
01750  00175A 51A6 B7 53E3     A   STAA  DIFF        STORE MSB RESULT
01760  00176A 51A9 FE 53E3     A   LDX   DIFF
01770  00177A 51AC 2F 11 51BF      BLE   MINFIN      IF LT ZERO MOVE TO INFIN
01780  00178A 51AE 7F EF70     A   CLR   $EF70       OTHERWISE MOVE TO ZERO
01790  00179A 51B1 01              NOP
01800  00180A 51B2 01              NOP
01810  00181A 51B3 01              NOP
01820  00182A 51B4 01              NOP
01830  00183A 51B5 01              NOP
01840  00184A 51B6 01              NOP
01850  00185A 51B7 01              NOP
01860  00186A 51B8 86 08       A   LDAA  #$88
01870  00187A 51BA B7 EF70     A   STAA  $EF70       MOVE MIRROR DOWN
01880  00188A 51BD 20 C6 5185      BRA   MZERO
01890  00189A 51BF BD 50A2   A MINFIN JSR COLECT     LOOK FOR DOT
01900  00190A 51C2 FE 53D6     A   LDX   DOT         DOT THERE?
01910  00191A 51C5 26 38 51FF      BNE   JUMP        IF DOT THERE, RETURN
01920  00192A 51C7 B6 EF08     A   LDAA  $EF08
01930  00193A 51CA 01              NOP
01940  00194A 51CB FE EF08     A   LDX   $EF08       GET MIRROR POSITION
```

```
01950 00195A 51CE FF 53E1   A          STX    LOCA       STORE MIRROR LOCATION
01960 00196A 51D1 B6 53E2   A          LDAA   LOCA+1     D. P. SUBTR FOR DONE TEST
01970 00197A 51D4 B0 53E0   A          SUBA   INFIN+1    LSB SUBTRACT
01980 00198A 51D7 B7 53E4   A          STAA   DIFF+1     STORE LSB RESULT
01990 00199A 51DA B6 53E1   A          LDAA   LOCA
02000 00200A 51DD B2 53DF   A          SBCA   INFIN      MSB SUBTRACT
02010 00201A 51E0 B7 53E3   A          STAA   DIFF       STORE MSB RESULT
02020 00202A 51E3 FE 53E3   A          LDX    DIFF       CHECK IF DONE
02030 00203A 51E6 2C 11 51F9            BGE    DIE        IF NO DOT, DIE
02040 00204A 51E8 7F EF70   A          CLR    $EF70      MOVE MIRROR TO INFINITY
02050 00205A 51EB 01                    NOP
02060 00206A 51EC 01                    NOP
02070 00207A 51ED 01                    NOP
02080 00208A 51EE 01                    NOP
02090 00209A 51EF 01                    NOP
02100 00210A 51F0 01                    NOP
02110 00211A 51F1 01                    NOP
02120 00212A 51F2 86 A8    A           LDAA   #$A8
02130 00213A 51F4 B7 EF70  A           STAA   $EF70      MOVE MIRROR
02140 00214A 51F7 20 C6 51BF           BRA    MINFIN     RETURN AND LOOK FOR DOT
02150 00215A 51F9 86 3F    A DIE       LDAA   #$3F
02160 00216A 51FB B7 51FE  A           STAA   BK
02170 00217A 51FE 01          BK       NOP
02180 00218A 51FF 39          JUMP     RTS
02190 00219                            ************************************************
02200 00220                            *    MIRROR MOVE (ADJUST) SUBROUTINE           **
02210 00221                            ************************************************
02220 00222A 5200 B6 5001  A MOVE      LDAA   CONV+1     D. P. SUBTR FOR #L.O.C.
02230 00223A 5203 B0 53D7  A           SUBA   DOT+1      L. O. C. =LINES OFF CENTER
02240 00224A 5206 B7 53F4  A           STAA   LOC+1      STORE LSB RESULT
02250 00225A 5209 B6 5000  A           LDAA   CONV
02260 00226A 520C B2 53D6  A           SBCA   DOT        MSB SUBTRACT
02270 00227A 520F B7 53F3  A           STAA   LOC        STORE MSB RESULT
02280 00228A 5212 7F 53F5  A           CLR    MM         CLEAR MOTOR MOVEMENT VAR
02290 00229A 5215 FE 53F3  A           LDX    LOC
02300 00230A 5218 27 3F 5259            BEQ    GOBCK      NO MOVE IF CONVERGENT
02310 00231A 521A 8C 01A0  A           CPX    #$1A0
02320 00232A 521D 27 3A 5259            BEQ    GOBCK      SYSTEM ERROR FILTER
02330 00233A 521F FE 53F3  A           LDX    LOC        GET LOC FOR BRANCH
02340 00234A 5222 2B 1B 523F            BMI    MVUP       IF LOC NEG, MOVE DOT UP
02350 00235A 5224 86 20    A MVDN      LDAA   #$20
02360 00236A 5226 B7 53F5  A           STAA   MM
02370 00237A 5229 BD 52FE  A           JSR    CLCMV
02380 00238A 522C 7F EF70  A           CLR    $EF70
02390 00239A 522F 01                    NOP
02400 00240A 5230 01                    NOP
02410 00241A 5231 01                    NOP
02420 00242A 5232 01                    NOP
02430 00243A 5233 01                    NOP
02440 00244A 5234 01                    NOP
02450 00245A 5235 01                    NOP
02460 00246A 5236 B6 53F5  A           LDAA   MM         GET MOTOR MOVEMENT
02470 00247A 5239 B7 EF70  A           STAA   $EF70
02480 00248A 523C 7E 5259  A           JMP    GOBCK      RETURN TO MAIN PROG
02490 00249A 523F B6 53F4  A MVUP      LDAA   LOC+1
02500 00250A 5242 40                    NEGA
02510 00251A 5243 B7 53F4  A           STAA   LOC+1      ABSOLUTE VALUE OF LOC
02520 00252A 5246 BD 52FE  A           JSR    CLCMV
02530 00253A 5249 7F EF70  A           CLR    $EF70
02540 00254A 524C 01                    NOP
02550 00255A 524D 01                    NOP
02560 00256A 524E 01                    NOP
02570 00257A 524F 01                    NOP
02580 00258A 5250 01                    NOP
02590 00259A 5251 01                    NOP
02600 00260A 5252 01                    NOP
02610 00261A 5253 B6 53F5  A           LDAA   MM         GET MOTOR MOVEMENT
02620 00262A 5256 B7 EF70  A           STAA   $EF70      STORE IN MOTOR PIA
02630 00263A 5259 39          GOBCK    RTS
02640 00264A 525A B6 EF08  A DIST      LDAA   $EF08
02650 00265A 525D 01                    NOP
02660 00266A 525E FE EF08  A           LDX    $EF08      GET MIRROR VOLTAGE
02670 00267A 5261 FF 53EF  A           STX    MIRAD      STORE IN MIRROR A/D
02680 00268A 5264 B6 53F0  A           LDAA   MIRAD+1    D. P. ADD- MIRROR A/D PLUS
02690 00269A 5267 8B FF    A           ADDA   #$FF       $3FF (BIAS FOR TABLE)
02700 00270A 5269 B7 53F2  A           STAA   TOFSET+1   STORE LSB IN TABLE OFFSET
02710 00271A 526C B6 53EF  A           LDAA   MIRAD
02720 00272A 526F 89 03    A           ADCA   #3         MSB ADD
02730 00273A 5271 B7 53F1  A           STAA   TOFSET     STORE MSB IN TABLE OFFSET
```

```
02740 00274A 5274 B6 53F2   A          LDAA   TOFSET+1   MULTATABLEFOFFSETBYWTWO
02750 00275A 5277 BB 53F2   A          ADDA   TOFSET+1   FOR D.P. DATA
02760 00276A 527A B7 53F2   A          STAA   TOFSET+1   STORE LSB
02770 00277A 527D B6 53F1   A          LDAA   TOFSET
02780 00278A 5280 B9 53F1   A          ADCA   TOFSET     ADD MSB
02790 00279A 5283 B7 53F1   A          STAA   TOFSET     STORE MSB
02800 00280A 5286 B6 53F1   A          LDAA   TOFSET     ADD IN TABLE INITIALIZE
02810 00281A 5289 9B 75     A          ADDA   #$75       LOCATE TABLE AT $7000
02820 00282A 528B B7 53F1   A          STAA   TOFSET     STORE IN MSB
02830 00283A 528E FE 53F1   A          LDX    TOFSET     GET TABLE OFFSET
02840 00284A 5291 FF 5295   A          STX    FLAG1+1    INJECT IN DATA RETR  LOCA
02850 00285A 5294 FE 7000   A FLAG1    LDX    $7000      GET OUTPUT DATA FROM TABLE
02860 00286A 5297 FF 53F6   A          STX    TEMP2      STORE TO DO BIAS $ SCALE
02870 00287A 529A FF 53E9   A          STX    ER1        STORE FOR ERROR CALC
02880 00288A 529D B6 53F7   A          LDAA   TEMP2+1    ADD LSB BIAS FACTOR
02890 00289A 52A0 BB 5006   A          ADDA   BIAS+1     LSB ADD
02900 00290A 52A3 B7 53F7   A          STAA   TEMP2+1    STORE BIASED LSB
02910 00291A 52A6 B6 53F6   A          LDAA   TEMP2
02920 00292A 52A9 B9 5005   A          ADCA   BIAS       ADD MSB BIAS FACTOR
02930 00293A 52AC B7 53F6   A          STAA   TEMP2      STORE BIASED MSB
02940 00294                     * MULTIPLY BY 1.5 TO APPROX SCALE OUTPUT**
02950 00295A 52AF B6 53F6   A          LDAA   TEMP2      GET MSB OF VOLTAGE
02960 00296A 52B2 44                   LSRA              DIVIDE BY 2
02970 00297A 52B3 B7 53F8   A          STAA   TEMP3      STORE MSB QUOTIENT
02980 00298A 52B6 B6 53F7   A          LDAA   TEMP2+1    GET LSB OF VOLTAGE
02990 00299A 52B9 46                   RORA              DIVIDE BY 2 (PULL CARRY IN)
03000 00300A 52BA B7 53F9   A          STAA   TEMP3+1    STORE LSB QUOTIENT
03010 00301A 52BD B6 53F7   A          LDAA   TEMP2+1    ADD FOR 1.5 SCALE FACTOR
03020 00302A 52C0 BB 53F9   A          ADDA   TEMP3+1    LSB ADD
03030 00303A 52C3 B7 53FB   A          STAA   INSOUT+1   STORE LSB OF ALTIM OUTPUT
03040 00304A 52C6 B6 53F8   A          LDAA   TEMP3
03050 00305A 52C9 B9 53F6   A          ADCA   TEMP2      MSB ADD
03060 00306A 52CC B7 53FA   A          STAA   INSOUT     STORE MSB OF ALTIM OUTPUT
03070 00307A 52CF FE 53FA   A          LDX    INSOUT     GET BIASED AND SCALED VALUE
03080 00308A 52D2 FF EF20   A          STX    $EF20      DO D/A CONV FOR ALTIM OUTPUT
03090 00309A 52D5 FE 53E9   A          LDX    ER1        GET ORIG TABLE VALUE
03100 00310A 52D8 FF EF24   A          STX    $EF24      DO D/A FOR STRIP CHART
03110 00311A 52DB B6 EF0C   A          LDAA   $EF0C
03120 00312A 52DE 01                   NOP
03130 00313A 52DF FE EF0C   A          LDX    $EF0C      GET TRACK VOLTAGE
03140 00314A 52E2 FF 53EB   A          STX    ER2        STORE FOR ERROR CALC
03150 00315A 52E5 B6 53EA   A          LDAA   ER1+1      D.P. SUBTR FOR ERROR CALC
03160 00316A 52E8 B0 53EC   A          SUBA   ER2+1      LSB SUBTR
03170 00317A 52EB B7 53EE   A          STAA   ERROR+1    LSB ERROR
03180 00318A 52EE B6 53E9   A          LDAA   ER1
03190 00319A 52F1 B2 53EB   A          SBCA   ER2        MSB SUBTRACT
03200 00320A 52F4 B7 53ED   A          STAA   ERROR      MSB ERROR
03210 00321A 52F7 FE 53ED   A          LDX    ERROR      GET FINAL ERROR VALUE
03220 00322A 52FA FF EF22   A          STX    $EF22      DO D/A FOR STRIP CHART
03230 00323A 53FD 39                   RTS
03240 00324A 52FE B6 53F4   A CLCMV    LDAA   LOC+1
03250 00325A 5301 B1 5002   A          CMPA   SMMV       MAKE A SMALL MOV'T?
03260 00326A 5304 2D 27 532D           BLT    SMALL
03270 00327A 5306 B1 5003   A          CMPA   MDMV       MAKE A MEDIUM MOV'T?
03280 00328A 5309 2D 18 5323           BLT    MED
03290 00329A 530B B1 5004   A          CMPA   LGMV       MAKE A LARGE MOV'T?
03300 00330A 530E 2D 0A 531A           BLT    LARGE
03310 00331A 5310 86 84     A LGST     LDAA   #$84       LARGEST POSS MOV'T
03320 00332A 5312 F6 53F5   A          LDAB   MM         GET DIRECTION
03330 00333A 5315 1B                   ABA               COMBINE
03340 00334A 5316 B7 53F5   A          STAA   MM         STORE COMPLETED MOV'T
03350 00335A 5319 39                   RTS
03360 00336A 531A 86 83     A LARGE    LDAA   #$83       LARGE MOV'T
03370 00337A 531C F6 53F5   A          LDAB   MM         GET DIRECTION
03380 00338A 531F 1B                   ABA               COMBINE
03390 00339A 5320 B7 53F5   A          STAA   MM         STORE COMPLETED MM
03400 00340A 5323 86 82     A MED      LDAA   #$82       MEDIUM MOV'T
03410 00341A 5325 F6 53F5   A          LDAB   MM         GET DIRECTION
03420 00342A 5328 1B                   ABA               COMBINE
03430 00343A 5329 B7 53F5   A          STAA   MM         STORE MOTOR MOV'T
03440 00344A 532C 39                   RTS
03450 00345A 532D 86 81     A SMALL    LDAA   #$81       SMALLEST POSS MOV'T
03460 00346A 532F F6 53F5   A          LDAB   MM         GET DIRECTION
03470 00347A 5332 1B                   ABA               COMBINE
03480 00348A 5333 B7 53F5   A          STAA   MM         STORE MOV'T
03490 00349A 5336 39                   RTS
03500 00350A 5337       0002 A VARI    RMB    2
03510 00351A 5339       0001 A STB1    RMB    1          # OF NO DOT PASSES
03520 00352A 533A       0001 A STABLE  RMB    1          # OF LINE STABLE PASSES
```

```
03530 00353A 533B   001E  A WDATA  RMB  30    WIDTH OF DOT DATA
03540 00354A 5359   003C  A LDATA  RMB  60    RASTER LINE # DATA
03550 00355A 5395   003C  A DDATA  RMB  60    DISPLACEMENT DATA
03560 00356A 53D1   0001  A COUNT1 RMB  1     # OF COLLECT PASSES
03570 00357A 53D2   0001  A NUMB1  RMB  1
03580 00358A 53D3   0002  A DUMMY  RMB  2     DUMMY TIME PAD VAR.
03590 00359A 53D5   0001  A COUNT2 RMB  1     # OF LINES WITH A GOOD DOT
03600 00360A 53D6   0002  A DOT    RMB  2     LOCATION OF DOT CENTER
03610 00361A 53D8   0002  A LINE   RMB  2     TEMP STORE FOR DOT CENTER
03620 00362A 53DA   0002  A MAX    RMB  2     SAME AS ABOVE
03630 00363A 53DC   0001  A WDCNT  RMB  1     # OF LINES W/ A GOOD DOT
03640 00364A 53DD   0002  A ZERO   RMB  2     MIRROR VOLTAGE @ DIST=0
03650 00365A 53DF   0002  A INFIN  RMB  2     MIRROR VOLTAGE @ D=INFIN
03660 00366A 53E1   0002  A LOCA   RMB  2     CURRENT VOLTAGE OF MIRROR
03670 00367A 53E3   0002  A DIFF   RMB  2     DIFF BETW LOCA AND GOAL
03680 00368A 53E5   0002  A TEMP1  RMB  2     TEMP REG FOR MOV'T CALC
03690 00369A 53E7   0002  A TADD   RMB  2     TABLE ADDRESS
03700 00370A 53E9   0002  A ER1    RMB  2     SYSTEM ERROR VAR 1
03710 00371A 53EB   0002  A ER2    RMB  2     SYSTEM ERROR VAR 2
03720 00372A 53ED   0002  A ERROR  RMB  2     RESULTANT SYSTEM ERROR
03730 00373A 53EF   0002  A MIRAD  RMB  2     MIRROR VOLTAGE FOR DIST
03740 00374A 53F1   0002  A TOFSET RMB  2     TABLE OFFSET (BIAS)
03750 00375A 53F3   0002  A LOC    RMB  2     # OF LINES OFF CONVERGE
03760 00376A 53F5   0001  A MM     RMB  1     MOTOR MOVEMENT
03770 00377A 53F6   0002  A TEMP2  RMB  2     TEMP REG FOR DIST CALC
03780 00378A 53F8   0002  A TEMP3  RMB  2     TEMP REG FOR DIST CALC
03790 00379A 53FA   0002  A INSOUT RMB  2     ALTIMETER OUTPUT VOLTAGE
03800 00380A 53FC 39         RETU  RTS
03810 00381                        END
TOTAL ERRORS 00000--00000

5171 ADD1    00153 00155*
     5005 BIAS    00013*00289 00292

51FE BK      00216 00217*
5102 CHECK   00107*00137
52FE CLCMV   00237 00252 00324*
50A2 COLECT  00045 00073*00143 00189
5000 CONV    00009*00061 00222 00225
53D1 COUNT1  00077 00100 00101 00356*
53D5 COUNT2  00079 00120 00135 00138 00359*
5143 DCENTR  00109 00138*
5395 DDATA   00075 00076 00130 00134 00142 00355*
51F9 DIE     00203 00215*
53E3 DIFF    00172 00175 00176 00198 00201 00202 00367*
513E DISAB   00119 00136*
525A DIST    00046 00069 00264*
53D6 DOT     00047 00104 00147 00150 00151 00155 00157 00164 00190 00223 00226 00360*
509D DRIVE   00065 00071*
53D3 DUMMY   00086 00087 00088 00089 00090 00091 00092 00093 00094 00095 00096 00097
             00098 00099 00358*
53E9 ER1     00287 00309 00315 00318 00370*
53EB ER2     00314 00316 00319 00371*
53ED ERROR   00317 00320 00321 00372*
5069 FILTER  00050*
5037 FLAG    00031*00037
5294 FLAG1   00284 00285*
505B GO      00045*00051 00057 00060 00067 00070 00072
5259 GOBCK   00230 00232 00248 00263*
5179 HUNT    00059 00159*
53DF INFIN   00160 00197 00200 00365*
53FA INSOUT  00303 00306 00307 00379*
50C1 JMP2    00084*00102
513B JMP4    00121 00135*
51FF JUMP    00165 00191 00218*
531A LARGE   00330 00336*
5359 LDATA   00073 00074 00124 00128 00140 00354*
5004 LGMV    00012*00329
5310 LGST    00331*
53D8 LINE    00141 00145 00148 00361*
53F3 LOC     00224 00227 00229 00233 00249 00251 00324 00375*
53E1 LOCA    00169 00170 00173 00195 00196 00199 00366*
5124 MARK2   00124*
5131 MARK3   00130*
53DA MAX     00143 00362*
5003 MDMV    00011*00327
5323 MED     00328 00340*
```

```
51BF  MINFIN  00177  00189*00214
53EF  MIRAD   00267  00268  00271  00373*
53F5  MM      00228  00236  00246  00261  00332  00334  00337  00339  00341  00343  00346  00348
              00376*
5200  MOVE    00071  00222*
5224  MVDN    00235*
523F  MVUP    00234  00249*
5185  MZERO   00163*00188
53D2  NUMB1   00078  00357*
5048  OUTLOP  00033  00038*
50FF  READ    00085  00106*
53FC  RETU    00380*
5084  RUN     00052  00061*
507C  SEND    00055  00058*
5095  SET1    00062  00068*
532D  SMALL   00326  00345*
5002  SMMV    00010*00325
5070  STA1    00048  00053*
533A  STABLE  00038  00064  00066  00068  00352*
5339  STB1    00039  00049  00054  00056  00058  00351*
53E7  TADD    00369*
53E5  TEMP1   00368*
53F6  TEMP2   00286  00288  00290  00291  00293  00295  00298  00301  00305  00377*
53F8  TEMP3   00297  00300  00302  00304  00378*
53F1  TOFSET  00270  00273  00274  00275  00276  00277  00278  00279  00280  00282  00283  00374*
5337  VARI    00350*
533B  WDATA   00353*
53DC  WDCNT   00139  00144  00146  00363*
53DD  ZERO    00162  00171  00174  00364*
```

I claim:

1. In a method for determining the altitude of a flight simulator probe moving relative to and above the terrain of a flight simulator model wherein the imaginary line extending from the probe in a direction normal to the model is characterized as the probe plumb line, the steps of:
   directing a pencil-like beam of radiation from said probe onto the model keeping said beam within a plane containing said probe plumb line to produce a beam spot on said model;
   detecting the location of said beam spot relative to two orthogonal coordinates with a detector situated remote from said probe plumb line and having a linear sensitivity zone optically aligned with said probe plumb line;
   varying the angular orientation of the beam within said probe plumb line plane and relative to a reference plane so as to cause said beam spot to impinge on the model site intersected by said probe plumb line;
   determining the angular orientation of the beam relative to said reference plane; and
   utilizing the determined angular orientation of said beam to determine the altitude of said probe over the terrain of the model.

2. The method of claim 1 including the step of, directing a second beam of radiation onto the terrain of the model from a position on the probe angularly spaced from the position of the first beam taken about an axis of revolution generally coaxially of said probe plumb line; and detecting the second beam spot when said first beam spot is obstructed by the terrain from reaching the intersection of the model and the probe plumb line.

3. The method of claim 1 wherein said beam of radiation is a beam of monochromatic, collimated light.

4. The method of claim 1 wherein the step of detecting the beam spot includes the step of directing a beam spot image through a light pipe on a path between the beam spot and the detector.

5. The method of claim 2 wherein the step of directing the second beam of radiation onto the terrain includes the step of splitting off of the first beam a portion of its energy to produce said second beam.

6. In a flight simulator apparatus of the type where a probe simulates an aircraft and the simulator operator controls the motion of the probe relative to the terrain of a model while viewing said model via a video monitor on said probe:
   means for directing a pencil-like beam of radiation from the probe onto the terrain of the model to produce a beam spot on the model where the beam impinges on the model, an imaginary line extending from said probe normal to said model being known as the probe plumb line;
   means supported by said probe for detecting the location of said beam impingement on said model, said means being remote from said probe plumb line, being two-dimensionally sensitive, and having a linear sensitivity zone in optical alignment with said probe plumb line;
   servo means coupled to said beam directing means and said detecting means for varying the angular direction of the beam in a plane containing the probe plumb line and maintaining the beam spot on the model at the site where the probe plumb line intersects the model;
   means for determining the angular orientation of the beam relative to a reference plane; and
   means for utilizing the determined angular orientation of said beam to determine the distance between said probe and said model measured along said probe plumb line.

7. The apparatus of claim 6 including:
   means for directing a second beam of radiation onto the terrain of the model from a position on the probe angularly spaced from the position of the first beam taken about an axis of revolution generally coaxial of said probe plumb line; and
   means for detecting the second beam spot when said first beam spot is obstructed by the terrain from reaching the model site intersected by the probe plumb line.

8. The apparatus of claim 6 wherein said means for directing a pencil-like beam of radiation includes means for directing a pencil-like beam of monochromatic, collimated light.

9. The apparatus of claim 6 including light pipe means for directing an image of said beam spot to said detecting means.

10. The apparatus of claim 7 including beam splitter means for splitting off a portion of said first beam to produce said second beam.

11. The apparatus of claim 6 wherein said detecting means includes a video camera.

* * * * *